United States Patent
Kraenzien

Patent Number: 6,050,523
Date of Patent: Apr. 18, 2000

[54] LEADING EDGE CONSTRUCTION FOR AN AERODYNAMIC SURFACE AND METHOD OF MAKING THE SAME

[75] Inventor: Peter Kraenzien, Hamburg, Germany

[73] Assignee: DaimlerChrysler Aerospace Airbus GmbH, Hamburg, Germany

[21] Appl. No.: 08/977,825

[22] Filed: Nov. 25, 1997

[30] Foreign Application Priority Data

Nov. 27, 1996 [DE] Germany ............................ 196 49 132

[51] Int. Cl.[7] .............................. B64C 1/00; B64C 3/00; B64C 5/00
[52] U.S. Cl. ........................... 244/123; 244/130; 244/199
[58] Field of Search .................... 244/123, 209, 244/207, 204, 201, 199, 130

[56] References Cited

U.S. PATENT DOCUMENTS

| | | | |
|---|---|---|---|
| 2,087,626 | 7/1937 | Minshall | 244/123 |
| 2,432,870 | 7/1947 | Blessing | 244/123 |
| 2,540,482 | 2/1951 | Hervey | 244/123 |
| 2,925,231 | 2/1960 | Pfaff, Jr. et al. | 244/209 |
| 3,117,751 | 1/1964 | Rogers et al. | 244/209 |
| 3,128,973 | 4/1964 | Dannenberg | 244/209 |
| 3,203,648 | 8/1965 | Vanesian | 244/209 |
| 3,309,042 | 3/1967 | Edwards | 244/123 |
| 3,450,374 | 6/1969 | Moore | 244/123 |
| 3,779,487 | 12/1973 | Ashton et al. | |
| 4,025,996 | 5/1977 | Saveker | 244/123 |
| 4,079,903 | 3/1978 | Ashton et al. | |
| 4,171,785 | 10/1979 | Isenberg | 244/209 |
| 4,310,132 | 1/1982 | Robinson et al. | 244/123 |
| 4,575,030 | 3/1986 | Gratzer | 244/209 |
| 4,726,548 | 2/1988 | Clites | 244/209 |
| 4,736,912 | 4/1988 | Loebert . | |
| 4,786,343 | 11/1988 | Hertzberg | 244/123 |
| 5,167,387 | 12/1992 | Hartwich | 244/204 |
| 5,316,032 | 5/1994 | DeCoux | 244/207 |
| 5,366,177 | 11/1994 | DeCoux | 244/209 |
| 5,368,258 | 11/1994 | Johnson et al. | 244/209 |
| 5,591,511 | 1/1997 | Yasui | 244/207 |
| 5,626,462 | 5/1997 | Jackson et al. | 416/97 R |

FOREIGN PATENT DOCUMENTS

| | | |
|---|---|---|
| 532093 | 3/1993 | European Pat. Off. . |
| 0665097 | 8/1995 | European Pat. Off. . |
| 1191540 | 4/1965 | Germany . |

OTHER PUBLICATIONS

Article by G. Warwick entitled "Jetstar Smoothes the Way" in Flight International, Sep. 21, 1985, pp. 32 to 34.

Primary Examiner—Jack W. Lavinder
Assistant Examiner—Judith A. Nelson
Attorney, Agent, or Firm—W. F. Fasse; W. G. Fasse

[57] ABSTRACT

A leading edge structure for an aerodynamic surface includes a support structure made of fiber-reinforced synthetic material and a skin structure made of metal mounted on the support structure. The support structure includes an inner laminate, an outer laminate, and longitudinally extending tubes and channels arranged between the inner and outer laminates, as well as a synthetic foam filler material in the spaces between the tubes, channels, and laminates. The skin structure includes an outer skin having perforations, especially in the form of suction holes, an inner skin, and spacer members interconnected therebetween so as to form a substantially form-stable metal skin structure. Respective holes pass through the inner skin, the outer laminate, and the walls of the tubes and channels in order to communicate the suction hole perforations of the outer skin with the interior spaces within the tubes and channels. The skin structure is adhesively bonded to the support structure. In a method for making the leading edge structure, the prefabricated components of the support structure are laid up, molded and cured in a positive mold, the prefabricated components of the skin structure are formed and soldered together on a positive mold, and then the skin structure is adhesively bonded onto the support structure.

21 Claims, 2 Drawing Sheets

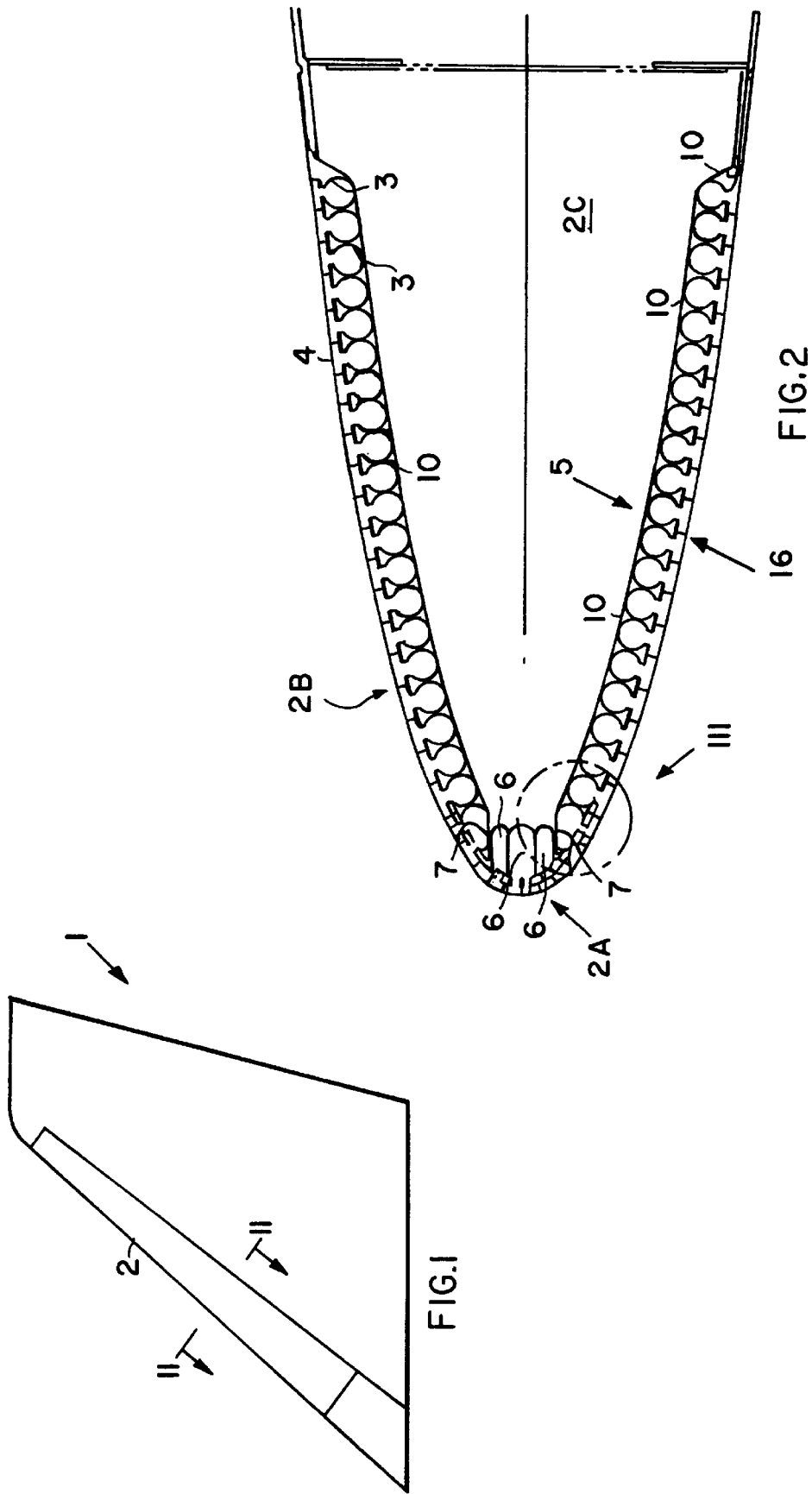

LEADING EDGE CONSTRUCTION FOR AN AERODYNAMIC SURFACE AND METHOD OF MAKING THE SAME

PRIORITY CLAIM

This application is based on and claims the priority under 35 U.S.C. §119 of German Patent Application 196 49 132.0, filed on Nov. 27, 1996.

FIELD OF THE INVENTION

The invention relates to a structure for a leading edge or nose of an aerodynamic surface, including a perforated outer skin mounted on a fiber reinforced synthetic support structure having channels extending therein. The invention further relates to a method of making such a leading edge structure.

BACKGROUND INFORMATION

It is generally known in the field of aerodynamics, that it is advantageous to form, maintain, and control a smooth, laminar boundary layer flow over an aerodynamic surface, and particularly the leading edge area of an aerodynamic surface, to reduce aerodynamic drag. As described in the article by G. Warwick entitled "Jetstar Smoothes the Way" in Flight International, Sep. 21, 1985, pages 32 to 34, for example, it is possible to provide such laminar flow control by sucking a portion of boundary layer flow through perforations or slots provided in a leading edge structure of an aerodynamic surface such as a wing. In order to achieve this, it is necessary that the outer skin or surface of the leading edge structure is formed by an air permeable, e.g. perforated, skin element. Certain difficulties arise in providing a support structure to support such an air permeable skin element from underneath or from the reverse side thereof.

Published European Patent Application No. 0,665,097 describes a method for manufacturing a leading edge structure of the above mentioned type having a perforated outer skin. More specifically, the leading edge structure comprises a support structure of fiber reinforced synthetic material having channels with a trapezoidal cross-sectional shape extending lengthwise therein, as well as a perforated outer skin that is adhesively bonded onto the support structure so as to form the outer surface of the leading edge. In order to produce such a leading edge structure, the reference discloses a method for forming a support structure for supporting the perforated sheet element that has a front or outer aerodynamic profile-defining surface and a reverse surface. The known method includes steps of supporting the perforated sheet element in a profile defining configuration, forming a mold tool for the support structure at least in part from the reverse surface of the perforated sheet element, forming a lay-up of fiber-reinforcing material together with a plastic or synthetic matrix material in the mold tool, and curing and consolidating the support structure by the application of heat and pressure.

A particular embodiment of the known method according to EP 0,665,097 involves laying into the mold tool a plurality of individual or discrete tool elements in the form of trapezoidal cross-sectional hollow and solid mandrels, which are preferably made of an elastic material such as silicone rubber. When a prepreg material for making the support structure is laid into the mold tool, the mandrels serve to form the prepreg into a corrugated shape. More specifically, the hollow mandrels are first arranged on the perforated sheet material that has been laid into the mold tool, such that small areas of the perforated sheet material remain exposed between adjacent ones of the hollow mandrels. Then the prepreg material is laid onto the hollow mandrels and laminated onto the perforated sheet material in the narrow exposed regions between adjacent mandrels. Next, the solid mandrels are inserted into the gaps formed between the hollow mandrels, and then the inner layer of the support structure is laminated onto the back sides of the solid mandrels and the prepreg supported by the hollow mandrels. This inner layer is then molded and pressed against the other layers by means of a corresponding mold tool, while the hollow interiors of the hollow mandrels are pressurized, whereby all of the prepreg layers are compressed. Heat is applied and the entire composite is cured. Thereafter, the hollow mandrels and the solid mandrels are withdrawn by being pulled lengthwise out of the resulting composite structure. The resulting structure thus comprises the corrugated prepreg layer in the form of corrugations or undulations with hollow corrugation chambers between the outer perforated sheet material and the inner layer.

The above described known method according to European Patent Application 0,665,097 suffers certain problems and disadvantages. Since the mandrels are made of an elastic material such as silicone rubber, they do not exhibit any significant stiffness or form stability, and as a result, it has been found to be quite difficult to properly and accurately lay the mandrels into position during the lay-up process and to remove the mandrels once the structure has been cured. Problems especially arise when the mandrels have a substantial length. In the known method, the molding of the support structure on the backside or reverse side of the perforated sheet element is naturally carried out in a negative mold matching and supporting the outer surface of the perforated sheet. As a result, the lay-up and forming operations are all performed from the backside or inner side of the structure, which leads to restricted accessibility and difficulty in preforming the lay-up procedure, especially if configurations having a tight radius of curvature are to be produced.

SUMMARY OF THE INVENTION

In view of the above, it is an object of the invention to provide a leading edge structure for an aerodynamic surface of the above described general type, having a construction that is more adaptable and more easily produced than the prior art constructions. It is a further object of the invention to provide a method for making such a leading edge structure, in which it is unnecessary to use negative molds and flexible lengthwise extending mandrels to be laid into the mold tool. The invention further aims to avoid or overcome the disadvantages of the prior art, and to achieve additional advantages, as apparent from the present description.

The above objects have been achieved in a leading edge structure for an aerodynamic surface according to the invention, comprising a support structure of fiber-reinforced synthetic material and a skin structure of a metal material that is connected to or mounted on the support structure. According to the invention, the support structure comprises an inner laminate layer, an outer laminate layer, and tubes and channels arranged between the inner and outer laminate layers. The skin structure includes a perforated outer skin, an inner skin, and spacer elements arranged therebetween, which together form a substantially rigid or form stable structure. the above objects have further been achieved in a method of making a leading edge structure according to the invention, comprising steps of laying the inner laminate onto a positive mold or bonding jig, laying the prepared tubes and channels with spacers therebetween onto the inner laminate, injecting or spraying on a filler material, laying the outer laminate onto the tubes and channels as well as the filler material therebetween, curing the synthetic materials preferably in an autoclave, and boring or otherwise forming the suction holes or other perforations through the outer laminate. Further according to the invention, the metal skin structure is formed by a method including steps of forming the inner skin to correspond to the contour of a positive mold apparatus which matches the contour of the outer laminate of the support structure, cutting the spacer elements to have oversized dimensions, connecting the spacer members to the inner skin by high temperature soldering or laser beam welding, milling the spacer members to the proper contour, forming or molding the outer skin, mounting and connecting the outer skin onto the spacer members by high temperature soldering, and boring or otherwise forming the suction holes through the outer skin. Finally, the prepared skin structure is adhesively bonded onto the prepared support structure.

By manufacturing the inventive leading edge structure by using the inventive method, it is possible to carry out all the necessary steps and especially the molding and forming of the support structure, with a minimal expenditure of time and effort, and a minimal cost. Furthermore, the leading edge structure and the method for forming it are simple, and easily adaptable to prepare leading edge structures having many different configurations, including tightly curved portions such as leading edges, as needed.

BRIEF DESCRIPTION OF THE DRAWINGS

In order that the invention may be clearly understood, it will now be described, in connection with example embodiments with reference to the drawings, wherein:

FIG. 1 is a schematic general view of a vertical stabilizer of an aircraft including a leading edge structure according to the invention;

FIG. 2 is a cross-sectional view of the leading edge structure along the section line II—II of FIG. 1, including a synthetic material support structure and a metal material skin structure;

Figure 3:
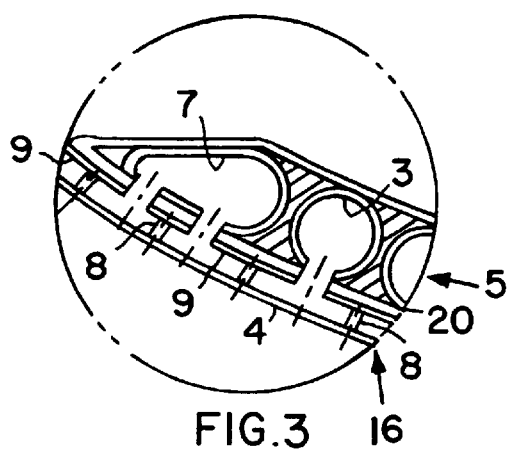
FIG. 3 is an enlarged sectional view showing the detail area III in FIG. 2.

DETAILED DESCRIPTION OF PREFERRED EXAMPLE EMBODIMENTS AND OF THE BEST MODE OF THE INVENTION

As an example of an aerodynamic surface, FIG. 1 shows a trapezoidally shaped vertical stabilizer 1 having a leading edge structure 2, of an aircraft. The leading edge structure 2 must have substantial strength and form stability because it must durably maintain the aerodynamic profile geometry of the leading edge area of the vertical stabilizer as determined by aerodynamic principles, while simultaneously withstanding and transmitting into the vertical stabilizer structure all forces acting on the leading edge area. Furthermore, in order to advantageously influence the laminar flow conditions within the boundary layer along the vertical stabilizer during flight of the aircraft, the leading edge structure 2 comprises an outer skin having perforations in the form of individual holes or slits or the like, through which the boundary layer may be suctioned-off in order to influence the laminar flow.

FIG. 2 shows the cross-section II—II through the leading edge structure 2 according to FIG. 1. As shown in FIG. 2, the leading edge structure 2 comprises a support structure 5 made substantially of synthetic or fiber-reinforced synthetic composite material and a skin structure 16 made substantially of metal, for example titanium. As can be seen in FIG. 2, the leading edge structure 2 includes a leading edge 2A and two aerodynamic surfaces 2B extending back therefrom. The support structure 5 includes a channel system predominantly made up of tubes 3 having a circular cross-section arranged along the aerodynamic surfaces 2B. However, the channel system also includes a group of channels 6 having a substantially rectangular cross-section (with rounded inner sides for example) arranged at the front leading edge 2A, as well as transition channels 7 having a substantially tear-drop shaped cross-section arranged on both sides between the rectangular-section channels 6 and the round-section tubes 3. The tubes 3 and the channels 6 and 7 of the channel system are embedded in a body of fiber-reinforced synthetic material so as to form a synthetic material composite structure. The inner wall of the synthetic material structure is a closed or solid wall formed by an inner laminate 10, which surrounds an interior hollow space 2C within the leading edge structure 2.

The skin structure 16 includes a perforated outer skin 4 of a suitable metal, such as titanium, that has perforation holes therein, which are respectively in communication with allocated ones of the tubes 3 and the channels 6 and 7. Namely, each of the tubes 3 and channels 6 and 7 is respectively in communication with the perforations or suction holes provided along a stripe-shaped area of the outer skin 4 extending in parallel along the respective tube 3 or channel 6 or 7. In this manner, a suction or vacuum applied to the channel system 3, 6 and 7 is effective for sucking boundary layer air flow through the perforations or suction holes in the outer skin 4. Moreover, the leading edge channels 6 may alternatively be supplied with a pressurized wetting, cleaning, or de-icing fluid so as to distribute such a fluid over the leading edge aerodynamic surfaces. The use of a different channel configuration 6 directly at and along the leading edge 2A of the leading edge structure 2 simplifies the construction and provides effective suction air channelling or ducting even in the restricted space within the tight or small radius of curvature of the leading edge. The transitional channels 7 provide a transition and uniform suction coverage between the standard tubes 3 and the leading edge rectangular sectional channels 6. Through appropriate combinations and arrangements of such circular tubes 3, rectangular sectional channels 6, and transitional channels 7, the present inventive support structure can be adapted to many different configurations of aerodynamic surfaces as needed.

FIG. 3 shows the detail area III of FIG. 2. This detail area shows the structural characteristics or features that are used throughout all areas of the present leading edge structure. FIG. 3 specifically shows the area of one of the transition channels 7 and its adjacent or neighboring tube 3. The skin structure 16, includes the above mentioned outer skin 4, an inner skin 9 and spacer members in the form of lath-shaped or batten-shaped webs 8 (i.e. individual flat strip web 8 as shown in FIG. 3) that space apart and interconnect the inner skin 9 and the outer skin 4. The skins 4 and 9, and the spacer elements 8 together form a substantially rigid and form-stable metal structure, which is bonded onto the synthetic material support structure 5 by an adhesive layer 20 or any known bonding means.

Figure 4:
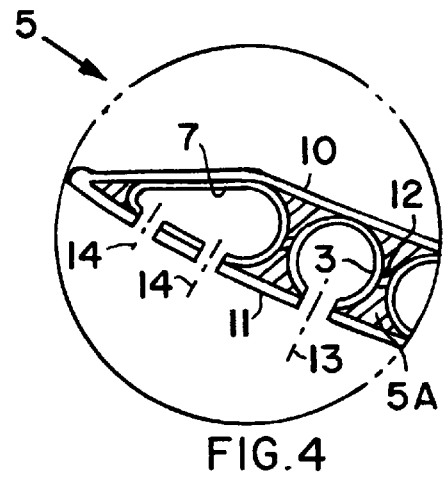
FIG. 4 is a detail view showing only the synthetic material support structure according to FIG. 3.
Figure 5:
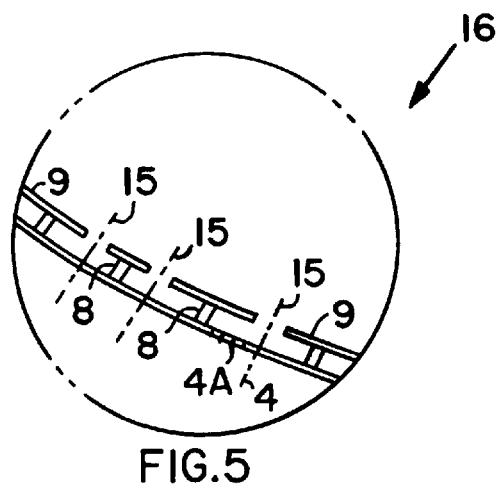
FIG. 5 is a detail view showing only the metal skin structure according to FIG. 3.

FIGS. 4 and 5 respectively and separately show the synthetic material support structure 5 and the metal skin structure 16 before these two components are connected together by adhesive bonding or otherwise. More specifically, FIG. 4 shows only the support structure 5 in the partial detail area of FIG. 3, whereby the support structure 5 essentially comprises the inner laminate 10, the tubes 3, the channels 7, as well as an outer laminate 11. The laminates 10 and 11 respectively comprise a plurality of layers of a fiber material, and preferably carbon fibers, embedded in a cured synthetic resin. The tubes 3 and the channels 7, as well as the channels 6 which are not shown here, are made of the same material, namely for example a carbon fiber reinforced synthetic resin. The hollow spaces between the tubes 3 and the channels 6 and 7 are filled with a cured synthetic foam 5A.

The tubes 3 and the channels 6 and 7 preferably respectively have a conical or tapering shape along their respective lengths, generally corresponding to the tapering trapezoidal shape of the vertical stabilizer 1, or particularly the leading edge structure 2 of the vertical stabilizer 1, as shown in FIG. 1. A single row of holes 13 is bored or otherwise formed through the outer laminate 11 and through the wall of each respective tube 3 so as to communicate with the interior of the respective tube 3, and two rows of holes 14 are bored or otherwise formed through the outer laminate 11 and the outer wall of the channel 7 to communicate with the interior thereof. The holes 13 and 14 may be individual round bored holes, or may be elongated holes or slots or the like. In order to facilitate the injection or spraying-in of the synthetic foam filler material 5A into the spaces between the tubes 3 and the channels 6 and 7, the respective neighboring tubes 3 and channels 6 and 7 may be spaced apart from one another by short spacer elements 12 arranged distributed in the lengthwise direction along the tubes and channels.

FIG. 5 shows only the metal skin structure 16 of the leading edge structure 2. A plurality of holes 15, or elongated holes, slots or slits or the like are bored or otherwise formed through the inner skin 9 at such locations that they overlap or coincide with the holes 13 and 14 provided in the support structure 5 when the skin structure 16 is mounted on and connected to the support structure 5. The spacer members or webs 8 interconnect the outer skin 4 and the inner skin 9, whereby these components are connected together by high temperature soldering and specifically so-called end-soldering or butt-soldering especially performed on the outer skin 4. With this construction, it is ensured that most of the surface of the outer skin 4 remains unblocked and available for providing suction through corresponding suction holes 4A, while only a respective narrow strip of the outer skin 4 extending along the soldered connection with the spacer web 8 is blocked and thus lost or unusable for suction. Moreover, the use of high temperature soldering or brazing achieves the additional advantage that deformation of the outer contour is avoided, while such deformations unavoidably arise if resistance welding is used instead.

Figure 6:
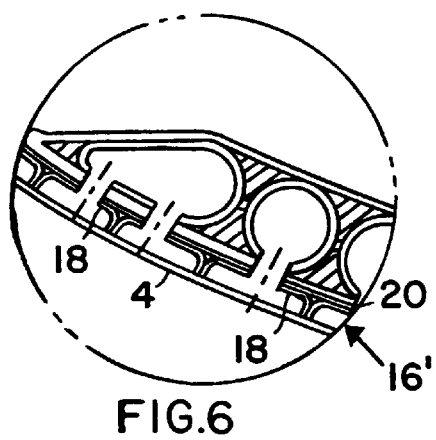
FIG. 6 is a detailed sectional view generally corresponding to FIG. 3, but showing an alternative embodiment using U-sectional members as spacer members.

FIG. 6 shows an alternative embodiment of the leading edge structure, in which the metal skin structure 16' has a slightly different configuration or construction. Namely, instead of batten-shaped spacer webs 8, U-shaped sectional members 18 serve as spacer members between the outer skin 4 and the inner skin 9. The U-shaped sectional members 18 are fabricated by bending in such a manner that the yoke or central web width of each sectional member 18 tapers or becomes narrower in a direction toward the free tip of the vertical stabilizer, in view of the tapering configuration of the leading edge structure 2 as shown in FIG. 1. The support structure 5 that is bonded to the alternative embodiment of the skin structure 16' as shown in FIG. 6 has the same configuration and construction as that shown and described above in relation to FIGS. 3 and 4.

Figure 7:
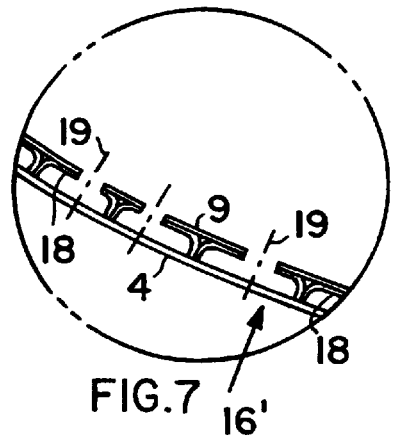
FIG. 7 is a detail view showing only the metal skin structure according to FIG. 6.

FIG. 7 shows the skin structure 16' according to the embodiment of FIG. 6, however without and before being connected to the support structure 5. As shown in FIG. 7, the metal skin structure 16' essentially comprises the outer skin 4, the inner skin 9, and the U-shaped sectional members 18 arranged therebetween, in such a manner that the yoke or central web portion of each sectional member 18 is in connect with and connected to the inner skin 9 while the free ends of the shanks of each sectional member 18 are in contact and connected with the outer skin 4. The side surfaces of the shanks of neighboring U-shaped sectional members 18 are in contact with one another, and are respectively connected together by high temperature soldering. Moreover, the sectional members 18 are once again connected to the inner skin 9 and the outer skin 4 by high temperature soldering.

Just as in the above described embodiment of FIGS. 3 to 5, also here in the embodiment of FIGS. 6 and 7 only small or narrow respective stripes of the perforated outer skin 4 are blocked or covered by the respective shank edges of the sectional members 18 connected therewith. Holes or openings 19 are bored or otherwise formed through the inner skin 9 and the yoke or central web of each sectional member 18, in appropriate locations so as to overlap or coincide with the holes 13 and 14 provided in the support structure 5. In this manner, the suction holes 4A through the outer skin 4 are in communication with open spaces formed inside the U-shaped sectional members 18, which in turn communicate through the holes 19 and holes 13 and 14 with the hollow channel spaces inside the tubes 3 and channels 6 and 7.

An example of a method for fabricating or manufacturing the support structure 5 will now be described. First, the inner and outer laminates 10 and 11 are formed or laid-up as respective prepregs or as finished cured laminated members, for example. The inner laminate 10 is laid onto a positive mold surface or bonding jig that has a surface shape substantially corresponding to the positive shape of the intended finished aerodynamic surface. The tubes 3 and channels 6 and 7, which have been previously prepared and formed, for example as prepreg members or as finished cured sectional members by extruding, laying-up or filament winding, are laid onto the inner laminate 10 and spaced from one another by placing the spacer elements 12 therebetween. The synthetic foam filler, e.g. a polymer foam 5A, is sprayed onto the tubes 3 and channels 6 and 7 and into the spaces therebetween so that the foam completely fills the spaces surrounding and between the tubes 3 and channels 6 and 7 and adheres to the inner laminate 10. The outer laminate 11 is then laid and pressed onto the tubes 3 and channels 6 and 7, and the synthetic foam filler material 5A. The assembled sandwich composite is then placed into an autoclave, for example, and allowed to cure. Finally, the suction holes 13 and 14 are bored or otherwise formed in any known manner through the outer laminate 11, the tubes 3 and the channels 6 and 7.

An example of a method for fabricating the metal skin structure 16 having the batten-shaped spacer webs 8 will now be described. First, the inner skin 9 is formed according to, and for example on, the contour of a forming jig that has a positive forming surface substantially corresponding to the finished positive configuration of the intended aerodynamic surface. Next, the batten-shaped spacer webs 8 are cut or otherwise fabricated to have an excessive dimension compared to the finished intended dimension, and especially referring to the web height dimension that will define the spacing between the inner skin and the outer skin. Then, the spacer webs 8 are connected to the inner skin 9 by high temperature soldering or laser beam welding. Next, the protruding free edges of the spacer webs 8 are milled or otherwise machined to the proper intended final contour. The outer skin 4 is formed into the proper surface configuration, for example on a corresponding positive forming jig or mold surface, and then the outer skin 4 is mounted on the spacer webs 8 and connected thereto by means of high temperature soldering. Finally, the suction holes 15 are bored or formed in any known manner through the inner skin 9. The suction perforations through the outer skin 4 are preferably preformed in the starting sheet material for the outer skin 4.

An example method for producing the metal skin structure 16' comprising U-shaped sectional members 18 as spacer members will now be described. First, the inner skin 9 is formed according to the surface contour of the forming jig, which has a positive surface contour substantially corresponding to the intended finished contour of the aerodynamic surface. The respective U-shaped sectional members 18 are each fabricated by bending operations, such that the yoke or central web of each sectional member 18 tapers toward one end that will be positioned toward the tip of the vertical stabilizer 1, and such that the respective free shanks of each sectional member 18 have an over-dimensioned protruding length. The U-shaped sectional members 18 are laid side-by-side onto the inner skin 9 and are connected thereto by high temperature soldering or laser beam welding. Next, the free protruding edges of the shanks of the sectional members 18 are milled or otherwise machined to the proper finished contour. The outer skin 4 is formed into the proper surface configuration, for example on a positive forming jig or mold surface. The formed outer skin 4 is placed onto and connected with the shanks of the sectional members 18 by high temperature soldering. Finally, the suction holes 19 are bored or otherwise formed through the inner skin 9 and the yokes or connecting webs of the U-shaped sectional members 18. The suction holes 4A through the outer skin 4 have been previously formed in the sheet material of the outer skin 4.

Once the support structure 5 and the skin structure 16 or 16' have been independently formed, these two structures are bonded together using any known adhesive or other bonding agent or process that is suitable for bonding the metal of the skin structure 16 or 16' with the fiber-reinforced synthetic material of the support structure 5. This bonding process can be carried out by placing the support structure 5 on a proper support jig, applying an adhesive thereto, and then clamping the skin structure 16 or 16' thereto as necessary.

By using a step of milling or otherwise machining the spacer webs 8 or the spacer shanks of the U-shaped sectional members 18 to the proper three-dimensional contour, which may be carried out by automated computer controlled machining equipment, it can easily be assured that the precise aerodynamic surface configuration required for the leading edge structure can be achieved with high accuracy and minimal effort. In other words, while the positive forming surfaces of the molds or jigs used according to the present method have substantially the same positive configuration as the intended finished aerodynamic surface, any minor deviations in the configuration are corrected or trued through the machining of the spacer members. By using pre-fabricated reinforced synthetic material tubes 3 and channels 6 and 7, it is achieved that the molding of the support structure 5 can be quickly and easily carried out. The tubes 3 and channels 6 and 7 may be completely fabricated and cured in a previous process, so that they are substantially stiff and form-stable members, which may be easily handled and placed into the forming molds in carrying out the method.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A leading edge structure for an aerodynamic surface, comprising a support structure, a skin structure arranged on said support structure, and an adhesive that bonds said skin structure onto said support structure, wherein:

said support structure comprises an inner laminate, an outer laminate spaced from said inner laminate, and channel members interposed between said outer and inner laminates, and said support structure essentially consists of at least one fiber-reinforced synthetic composite material;

said skin structure comprises an inner skin surfacially bonded to said outer laminate by said adhesive interposed therebetween, a perforated outer skin that has first holes therein and that is spaced from said inner skin, and spacer members interposed between said outer and inner skins, and said skin structure essentially consists of at least one metal; and said first holes in said outer skin pass through said outer skin and into respective hollow spaces formed between said outer and inner skins, and said outer laminate and said inner skin mutually have a plurality of second holes therethrough that communicate said hollow spaces with hollow channels formed within said channel members.

2. The leading edge structure according to claim 1, wherein said skin structure is a form-stable structure.

3. The leading edge structure according to claim 1, wherein each of said inner and outer laminates respectively comprises a plurality of layers of reinforcing fibers embedded in a synthetic resin, said channel members are respective hollow sectional members comprising said reinforcing fibers embedded in said synthetic resin, said inner and outer skins respectively comprise a sheet of a metal, and said spacer members are respective sectional members of said metal.

4. The leading edge structure according to claim 3, wherein said reinforcing fibers are carbon fibers, and said metal is titanium.

5. The leading edge structure according to claim 1, further comprising a cured synthetic foam filler material in spaces surrounding said channel members between said inner and outer laminates.

6. The leading edge structure according to claim 1, wherein each of said channel members respectively contacts said inner laminate and said outer laminate, and each of said spacer members contacts and is connected by high temperature soldering to said inner skin and said outer skin.

7. The leading edge structure according to claim 1, further comprising spacer elements arranged respectively between adjacent ones of said channel members to hold said channel members spaced apart from one another.

8. The leading edge structure according to claim 1, wherein said channel members comprise tubes having a circular cross-section, and further comprise at least one non-circular sectional channel member, and wherein said channel members extend longitudinally substantially parallel to a leading edge of said leading edge structure.

9. The leading edge structure according to claim 8, wherein each said channel member respectively has a dimension parallel to said laminates that tapers along a longitudinal length of said channel member.

10. The leading edge structure according to claim 8, having said leading edge and two external aerodynamic surfaces extending from said leading edge, wherein said tubes are arranged inwardly adjacent said aerodynamic surfaces, and said at least one non-circular sectional channel member comprises at least one generally rectangular sectional channel member arranged inwardly adjacent said leading edge.

11. The leading edge structure according to claim 10, wherein said at least one non-circular sectional member further comprises at least one transitional channel member having a substantially teardrop-shaped cross-section arranged between one of said tubes and said at least one generally rectangular sectional channel member inwardly adjacent a transition area at which at least one of said aerodynamic surfaces adjoins said leading edge.

12. The leading edge structure according to claim 8, having said leading edge and two external aerodynamic surfaces extending from said leading edge, and comprising two of said skin structures extending along and forming said two aerodynamic surfaces, and two of said support structures respectively arranged inwardly adjacent and supporting said two skin structures, with a hollow space formed within said leading edge structure between respective inner laminates of said two support structures.

13. The leading edge structure according to claim 1, wherein said spacer members comprise individual flat strip spacer webs arranged spaced apart from one another.

14. The leading edge structure according to claim 1, wherein said spacer members comprise U-shaped sectional members each respectively having two shank webs extending perpendicularly between said inner and outer skins and a yoke web interconnecting said two shank webs and extending parallel to and alone one of said inner and outer skins.

15. The leading edge structure according to claim 14, wherein said U-shaped sectional members are arranged contacting and connected to one another along respective ones of said shank webs, with said yoke web contacting and connected to said inner skin.

16. A method of making the leading edge structure according to claim 7, said method comprising the following steps:
a) laying said inner laminate onto a positive mold surface;
b) laying said channel members onto said inner laminate and positioning said spacer elements between adjacent ones of said channel members;
c) spraying a synthetic filler material onto said channel members and into spaces therebetween;
d) laying said outer laminate onto said channel members and said synthetic filler material to form a composite sandwich;
e) curing said composite sandwich to form said support structure;
f) making said second holes through said outer laminate and said channel members to communicate into said hollow channels within said channel members;
g) fabricating said skin structure; and
h) bonding said skin structure onto said support structure using said adhesive.

17. A method of making the leading edge structure according to claim 13, said method comprising the following steps:
a) forming said inner skin on a positive form surface;
b) fabricating said spacer webs so as to have an excessive web dimension;
c) arranging said spacer webs on and connecting said spacer webs to said inner skin using one of high temperature soldering and laser beam welding;
d) machining free protruding edges of said spacer webs so as to reduce said excessive web dimension to a finished web dimension and so as to shape said free protruding edges of said spacer webs to lie on a finished three-dimensional contour;
e) forming said outer skin on a positive form surface;
f) connecting said outer skin onto said spacer webs by high-temperature soldering so as to form said skin structure;
g) making said second holes through said inner skin;
h) fabricating said support structure; and
i) bonding said skin structure onto said support structure using said adhesive.

18. The method according to claim 17, wherein said step of fabricating said support structure comprises the following steps:
j) laying said inner laminate onto a positive mold surface;
k) laying said channel members onto said inner laminate and positioning spacer elements between adjacent ones of said channel members;
l) spraying a synthetic filler material onto said channel members and into spaces therebetween;
m) laying said outer laminate onto said channel members and said synthetic filler material to form a composite sandwich;
n) curing said composite sandwich to form said support structure; and
o) forming said second holes through said outer laminate and said channel members to communicate into said hollow channels within said channel members.

19. A method of making the leading edge structure according to claim 14, said method comprising the following steps:
a) forming said inner skin on a positive form surface;
b) fabricating said U-shaped sectional members by bending operations so that said shank webs respectively have an excessive dimension and so that said yoke web of each said sectional member has a dimension between said shank webs that tapers along a length of said sectional member;
c) arranging said U-shaped sectional members on and connecting said U-shaped sectional members to said inner skin using one of high temperature soldering and laser beam welding;
d) machining free protruding edges of said shank webs of said U-shaped sectional members so as to respectively reduce said excessive dimension to a finished web dimension and so as to shape said free protruding edges of said shank webs to lie on a finished three-dimensional contour;
e) forming said outer skin on a positive form surface;
f) connecting said outer skin onto said shank webs of said U-shaped sectional members by high-temperature soldering so as to form said skin structure;

g) making said second holes through said inner skin and said yoke webs of said U-shaped sectional members;

h) fabricating said support structure; and i) bonding said skin structure onto said support structure.

20. The method according to claim 19, wherein said step of fabricating said support structure comprises the following steps:

j) laying said inner laminate onto a positive mold surface;

k) laying said channel members onto said inner laminate and positioning spacer elements between adjacent ones of said channel members;

l) spraying a synthetic filler material onto said channel members and into spaces therebetween;

m) laying said outer laminate onto said channel members and said synthetic filler material to form a composite sandwich;

n) curing said composite sandwich to form said support structure; and o) forming said second holes through said outer laminate and said channel members to communicate into said hollow channels within said channel members.

21. The leading edge structure according to claim 1, wherein said hollow spaces and said hollow channels respectively extend longitudinally along and parallel to each other.

* * * * *

UNITED STATES PATENT AND TRADEMARK OFFICE
CERTIFICATE OF CORRECTION

PATENT NO.   : 6,050,523
DATED        : Apr. 18, 2000
INVENTOR(S)  : Kraenzien

It is certified that error appears in the above-identified patent and that said Letters Patent is hereby corrected as shown below:

Col. 2,  line 65;   after "structure.", replace "the" by --The--;

Col. 9,  line 3,    after "cross-section", delete ",";

Col. 11, line 4,    after "structure", insert --using said adhesive--. (1st occur.)

Signed and Sealed this

Sixth Day of March, 2001

Attest:

NICHOLAS P. GODICI

*Attesting Officer*        *Acting Director of the United States Patent and Trademark Office*